ated on the market may have, at present, features which would permit them to use my invention or may be adapted to use my invention by the addition of minor structural modifications. A coil winding machine incorporating my invention includes a suitable support structure 2. Provided on the support structure 2 is a drive motor 4 which has a drive shaft 8 extending therefrom. A fluid operated brake 10, selected from the numerous types presently available, is disposed around the drive shaft to stop the rotation of the shaft 8 when the motor 4 is de-energized in the manner to be described in detail hereinafter. A gear box or transmission system 12 is driven by the drive shaft and in turn drives a rotatable shaft 14. Disposed on the rotatable shaft 14 is a coil form holding means 16 and mounted therefrom on a portion of the support structure 2 is a second coil form holding means 18. The coil form holding means 16 and 18 should be of the variety which permits the quick insertion or removal of a coil form 20, shown in mounted position in Fig. 1. If desired, the coil form 20 may be constituted by a powdered iron or ferrite core which would form a permanent part of the coil structure. In the illustration, a coil 22 is being wound on the coil form 20. A standard level winding means 24 is provided on the machine and may be actuated by a screw device 26 driven by the transmission system 12.

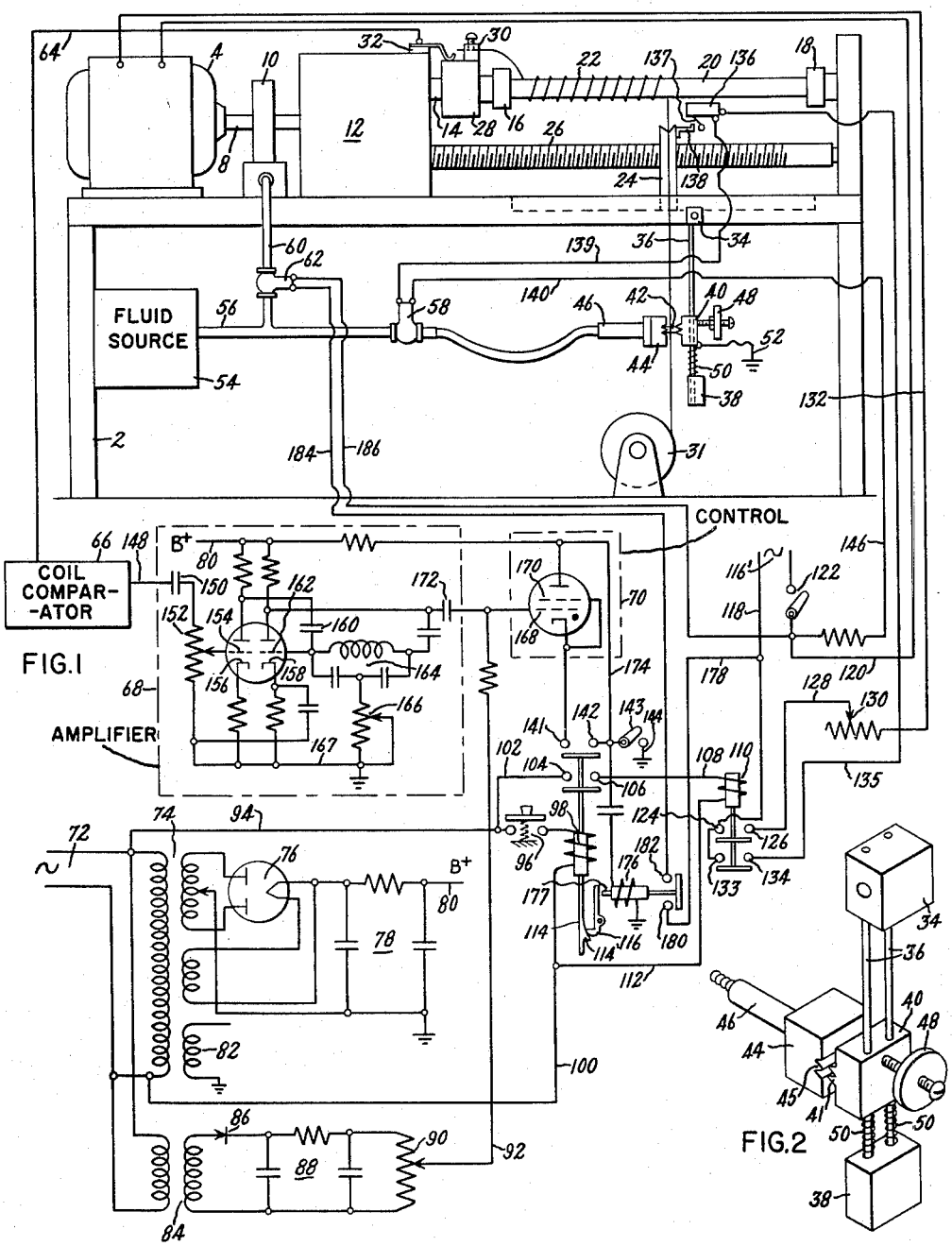

2,947,488

AUTOMATIC COIL WINDING MACHINE

Francis D. Trotta, Utica, N.Y., assignor to General Electric Company, a corporation of New York Filed Apr. 16, 1956, Ser. No. 578,452

4 Claims. (Cl. 242—9)

This invention relates to a novel automatic coil winding machine.

It is a well known technique in the art of winding coils to obtain a predetermined value of inductance to provide a control system for a coil winding machine which automatically counts the turns of the coil and halts the action of the machine when a predetermined number of turns have been wound. By this method a coil may be wound to approximate the inductance which it is desired to provide in the coil. However, inaccuracies in the machine by virtue of the tolerances incorporated in its construction results in a non-uniform spacing of the turns throughout the length of the coil and by merely counting the number of turns there is no assurance that the coil will have the proper amount of inductance. Therefore, in the manufacture of precision wound coils it is necessary to place the coil in a testing device after it has been wound and to adjust the inductance accordingly to bring it within the tolerance limits decided upon.

Therefore, it is an object of this invention to provide a novel automatic coil winding machine which winds a coil automatically to very close tolerance limits.

It is another object of this invention to provide a novel coil winding machine which winds a coil to a predetermined value of inductnce by measuring the inductance in the coil during the winding operation.

It is still another object of this invention to provide a novel automatic winding machine which includes a means for automatically placing a coil being wound in a testing and control circuit during the winding operation.

Briefly, in one form of my invention I achieve these objects by the provision of a coil winding machine which has a permanent electrical contact provided thereon to which a coil being wound is attached. A second electrical contact is automatically applied after a predetermine amount of the coil has been wound. Upon the application of the second electrical contact, the coil is placed in a circuit which develops a signal when the desired amount of inductance has been reached. After suitable amplification, the signal energizes a control device which automatically halts the operation of the machine.

The novel features which I believe to be characteristic of my invention are set forth with particularity in the appended claims. My invention itself, however, as to its organization and method of operation together with further objects and advantages thereof, may best be understood by reference to the following description taken in connection with the accompanying drawing in which:

Figure 1 is an illustration, partially schematic, of a coil winding machine and a control means incorporating my invention, and;

Figure 2 is a view in perspective of an automatic grounding device incorporating my invention.

An automatic coil winding machine embodying my invention is illustrated in Figure 1. The winding machine and its details are shown for purposes of illustration only, as standard coil winding machines available In accordance with my invention, I provide a circular electrical conductor or slip ring 28 mounted on the drive shaft 14. Attached to the slip ring 28 is a wire holding electrical contact 30 which may take numerous forms, as for example, the screw type attachment illustrated, but is preferably of a type to which the wire being wound may be quickly attached. A stationary electrical contact 32 is mounted on a suitable portion of the winding machine and engages the slip ring 28.

As may be seen in detail in Figure 2, attached to the support 2 of the coil winding machine by a bracket such as illustrated at 34, are a pair of vertical guide rods 36 which are held together at their bottoms by a suitable block or support 38. Slidably mounted on the guide rods 36 is a metallic block 40 which has a plurality of raised or tooth surfaces 41 provided thereon. A rod 42 is attached to the metallic block 40 and extends substantially normal to the tooth surface thereof. Slidably mounted on the support rod 42 is a second or movable block 44 which has provided a plurality of indentations 45 matching the teeth 41 on the block 40. An actuating piston and cylinder device is provided for movable block 44 in order to move it into engagement with the block 40. If necessary, an adjustable counter balance device such as illustrated at 48 may be mounted on the block 40 in order to overcome the weight of the block 44 and piston and cylinder actuator 46. A shock absorbing spring 50 encompasses each of the guide rods 36. A connection 52 extends from the block 40 in order to provide an electrical ground for this block.

In order to move the block 44 toward the grounded block 40, I provide a source of fluid pressure as illustrated schematically at 54. Conduit 56, a portion of which may be flexible, connects the fluid pressure source 54 to the piston and cylinder actuating device 46 and the flow of fluid is controlled by a solenoid operated valve shown at 58. A second conduit 60 extending from the conduit 56 supplies fluid pressure to the hydraulically actuated brake 10 and flow in this line is in turn controlled by a second solenoid operated valve 62.

The means for automatically controlling the operation of the winding machine is constituted by a conductor 64 which is connected to the fixed electrical contact 32.

When the coil 22 has been grounded by the automatic grounding device in a manner to be described in greater detail hereinafter, it is placed by virtue of the ground connection 52 and conductor 64 in the tank or frequency determining circuit of a coil comparator 66. This device is a standard commercial signal generating device which compares the value of inductance in a coil being wound against that of a reference coil. The output of the coil comparator is coupled to a frequency selective amplifier 68 which is constructed to amplify a signal of predetermined frequency. Upon the generation of the predetermined signal, the amplifier 68 causes a control tube 70 to be actuated which halts the action of the machine in a manner to be described hereinafter.

The control circuit for initiating and halting the action of the coil winding machine includes a source of alternating current potential as indicated at 72. This power source is applied through a transformer 74 to a full wave rectification device 76. The output of the rectifier 76, after being filtered in the network 78 is supplied over the conductor 80 and constitutes a standard B+ operating potential for the amplifier 68 and control device 70. Also operating off the transformer 74 is a secondary winding 82 providing suitable filament operating potentials through connections (not shown) to the vacuum tubes of amplifier 68 and control device 70. A second transformer 84 coupled to the source of A.C. potential supplies a rectifier 86 which after filtering in the network 88 is supplied through the potentiometer 90 over a conductor 92 to supply a biasing voltage for the control device 70.

A conductor 94 is connected to the source of potential 72 and has provided therein a manually operated switch 96. The output of the switch 96 is coupled to an actuating coil of a first electrical relay 98. The actuating coil is returned to the line by means of a conductor 100. A conductor 102 is connected to the conductor 94 and thereby to the line and is connected also to the first contact 104 of another set of contacts in the relay 98. The first contact 104 is adapted to be electrically connected to a second contact 106 when the coil of the relay 98 is energized. A conductor 108 couples the output of the electrical contact 106 to the coil of a second relay 110 which is returned to the line via conductors 112 and 100. In order that the manually operated switch 96 need not be held in its closed position, an armature 114 of the first relay 98 is provided with a holding lug 114' which is engaged by a latch 116 when it is in the raised or contact closing position as illustrated schematically in the drawing.

A source of electrical potential 116' which may be the same source as that indicated at 72 is supplied to the motor 4 in the following manner. The conductor 118 extends to an electrical contact 124 of the second relay 100 and is adapted to be engaged with the electrical contact 126 when the relay is energized. A conductor 128 couples the contact 126 to a motor speed controlling potentiometer 130 which is in turn coupled to the one side of the motor by the conductor 132. The return from the motor, as may be seen, is constituted by the conductor 120 through a manual line switch 122. A second set of contacts 133 and 134 form a part of the relay 110 and are closed at the same time as are the contacts 124 and 126. The output of the contact 134 is connected through a conductor 135 to a switch 136 mounted at a suitable position on the winding machine. A contact 137 in the switch 136 is adapted to be closed by a suitable cam or actuator 138 which may be mounted on the level winding means 24 so that at a predetermined point in the travel of the level winding means, the switch 136 is closed. When the switch 136 is closed, a circuit is completed to the solenoid operated valve 58 via the conductor 139 and is returned to the line over the conductor 140.

The relay 98, in addition to closing the contacts 104 and 106, also closes the contacts 141 and 142, which when the switch 143 is closed, establishes a ground connection as shown at 144 to the control device for a purpose to be brought out hereinafter.

The frequency selective amplifier receives the output of the coil comparator over a conductor 148 and a coupling capacitor 150. A level setting potentiometer 152 completes the coupling of the output of the coil comparator to the grid 154 of a first triode amplifier 156 which may be incorporated, if desired, in the same envelope as a second triode amplifier 158. The second triode amplifier receives the output of the first triode amplifier 156 via the coupling capacitor 160 so that the signal is applied to the grid 162 of the second triode amplifier. In order that the amplifying device 68 be frequency selective, a filtering network 164 which includes an adjustable resistance 166 and feedback loop 167 are incorporated in the output of the amplifier 158 so that all frequencies except that of a predetermined frequency are degeneratively coupled to the input of the first amplifier 156. Coupling the output of the second amplifier 158 to a gas filled control tube 170 is a capacitor 172. The output of the control tube 170 is connected via a conductor 174 to the energizing coil of a third relay 176. Included in the third relay 176 is a plunger 177 engageable with the latch 116 to release it when the relay is operated. Conductor 178 is connected to one side of the power supply from the conductor 118 to a contact 180 in the third relay. A second contact 182 in this relay is adapted to be connected with the contact 180 when the relay is energized, and completes a circuit via the conductor 184 and return conductor 186 to the solenoid actuated valve 62.

In order to operate this device, the switches 122 and 143 are closed and the manual switch 96 is closed. This completes a circuit via the conductors 94 and 100 to the coil of the first relay 98. Upon actuation of this relay, the contacts 104 and 106 are closed and the second relay 110 is energized and remains energized even after the switch 96 is released via the conductors 94, 102, contacts 104, 106, conductors 108, and conductor 100. When the second relay 110 is actuated by the energization of its coil, the contacts 124 and 126 are placed in engagement with each other. In this position, the motor is energized through the conductor 118, contacts 124, 126, conductor 128, motor controlling potentiometer 130, conductor 132 and return conductor 120. The energizing of the coil 110 also closes the contacts 133 and 134 to condition a circuit through conductor 118, contacts 133 and 134 and conductor 135 to the switch 136, so that when the switch is closed by the action of the cam 138 on its contact 137, a circuit to the solenoid operated valve 58 for the automatic grounding device is completed via the conductors 139 and 140. At the same time the first relay 98 closes the contacts 104 and 106, it also closes the contacts 141 and 142 so that a return path to ground is offered for the plate current of the control tube 170.

In this manner, the machine is put into operation and the automatic grounding device is conditioned to be operated at a predetermined point. This predetermined point is determined by the position of the switch 136 and may be when 75% of the coil has been wound. At that point, fluid is admitted to the piston and cylinder device 46. As a consequence of this, the movable block 44 is forced into engagement with the grounded block 40. The force of this engagement establishes an electrical contact with the wire from the spool 31 which is threaded between the blocks 40 and 44. By application of the proper fluid pressure, it is possible to make this electrical contact without destroying the insulation of the wire being wound. When the matching teeth in 41 on the block 40 engage the matching indentations 45 on the movable block 44, the automatic grounding device is clamped securely to the wire being wound and it travels upwardly as the wire moves upwardly guided by the vertical guide rods 36. The grounding device is released when the winding is halted in a manner to be described below.

Upon the completion of the ground connection, the coil 22 is now in the coil comparator circuit. The coil comparator may constitute a test oscillator which includes the coil 22 as a portion of its tank circuit, and a reference oscillator oscillating at a fixed frequency. The outputs of these two oscillators are coupled to a mixing device so that the output of the coil comparator is an alternating current signal of beat frequency representing the difference between frequencies of the reference oscillator and the test oscillator. This beat difference signal is applied to the amplifier 68 which is adapted to pass only a signal of a predetermined frequency in the manner described above. Upon the receipt of the beat frequency signal having the predetermined value which is a function of the value of the inductance in the coil 22, amplifiers 156 and 158 conduct and the output thereof is applied to the grid 168 of the control tube 170. This voltage is of such a value as to bias the control tube into conduction causing a current through the coil of the third relay 176. Upon actuation of this third relay, the plunger 177 engages the latch 116 to release it from the lug 114' permitting the contacts 104 and 106 and 141 and 142 to become disengaged. When the contacts 104 and 106 are opened, the circuit to the second relay 110 is broken so that the contacts 124 and 126 and 133 and 134 are disengaged to open the circuit to the motor 4 and solenoid operated valve 58 in the grounding device fluid circuit. When valve 58 opens, the grounding device is released to fall toward the support 38 on the shock absorbing springs 50. At the same time, the contacts 182 and 180 are closed to complete a circuit via conductors 118 and 178, contacts 180, 182 and conductors 184 and 186 to the brake solenoid actuated valve 62 to apply the fluid operated brake 10 to the shaft 8.

It may be seen that this construction affords the means for automatically placing a coil being wound into a testing circuit during its winding operation and still permit winding of the coil until a predetermined value of inductance has been reached. It further provides the advantage of winding until the desired inductance is available and does not rely upon a mechanical counting of the turns and a subsequent testing of the inductive value of the coil to reach the desired values.

While I have illustrated a particular embodiment of my invention, it will of course be understood that I do not wish to be limited thereto since various modifications both in the circuit arrangement and in the instrumentalities employed may be made and I contemplate by the appended claims to cover any such modifications as fall within the true spirit and scope of my invention.

What I claim as new and desire to secure by Letters Patent of the United States is:

1. An automatic coil winding machine for winding insulated wire on a core comprising drive means for said core, a level winder disposed adjacent said core during winding and driven by said drive means, a circular electrical conductor secured to said core and rotatable therewith, an electrical terminal on said circular electrical conductor adapted to hold a first terminal of the coil being wound, a stationary electrical conductor in contact with said circular electrical conductor, a movable terminal connection for said insulated wire, means to automatically and fixedly clamp said movable terminal connection to said insulated wire at a point on the unwound wire which is spaced from the coil after a predetermined portion of said coil has been wound, an electrical circuit including said stationary electrical conductor and said movable terminal connection with said coil being wound, said electrical circuit developing a signal when the coil is wound to a predetermined value of inductance, and means responsive to said signal to stop said drive means.

2. An automatic coil winding machine comprising a rotatable coil carrier to receive insulated wire to be wound into coils of a predetermined value of inductance, electrical contact means on said carrier engageable with a first terminal of the coil being wound, means establishing a clamped electrical connection to the source of insulated wire after a predetermined portion of said coil has been wound, an electrical signal source coupled to said electrical contact means and the wire source through said clamped electrical connection whereby the coil is included in a circuit with said electrical signal source to generate a signal when the coil has been wound to a predetermined value of inductance, and means responsive to said electrical signal to stop said coil winding means, said clamped electrical connection moving with the insulated wire during winding of the concluding portion of the coil.

3. An automatic winding machine comprising a rotatable coil form holder, a motor connected to and driving said holder for winding a coil thereon, a level winder disposed adjacent said holder, means to move said level winder axially of said holder during winding of the coil, guide means depending below said winder, a terminal metallic block slidably mounted on said guide means, one face of said terminal block having a plurality of teeth provided thereon, a support rod mounted on said terminal block and extending normally to said face, a second block slidably mounted on said support rod, means attached to said second block to move it on said support rod against said terminal block, a spool containing a supply of insulated wire to be wound into a coil disposed below said guide means, said insulated wire from said spool being trained between said blocks and over said winder to said coil form holder on which it is to be wound, control means to move said second block towards said terminal block when a predetermined length of said coil has been wound, thereby to establish one terminal connection to said coil during the winding thereof, and means including a slip ring connection for establishing a terminal connection to the other end of the coil during winding to permit accurate measurement of the electrical properties of the coil during the concluding portion of the winding operation.

4. The device of claim 3 wherein said control means comprises a cam on said level winder and an electrical circuit including a switch closed by said cam during the travel of said level winder to activate said control means.

References Cited in the file of this patent

UNITED STATES PATENTS

| | | |
|---|---|---|
| 1,921,869 | Ewald | Aug. 8, 1933 |
| 2,319,413 | Leathers et al. | May 18, 1943 |
| 2,327,054 | Mays | Aug. 17, 1943 |
| 2,535,940 | Malvin | Dec. 26, 1950 |
| 2,568,466 | Scott | Sept. 18, 1951 |
| 2,683,567 | Lense | July 13, 1954 |
| 2,697,559 | Scarce et al. | Dec. 21, 1954 |
| 2,782,368 | McCarthy | Feb. 19, 1957 |